United States Patent
Land et al.

(10) Patent No.: US 9,291,495 B2
(45) Date of Patent: Mar. 22, 2016

(54) PROXIMITY SENSOR WITH COMBINED LIGHT SENSOR HAVING AN INCREASED VIEWING ANGLE

(71) Applicant: Apple Inc., Cupertino, CA (US)

(72) Inventors: Brian R. Land, Woodside, CA (US); Richard Ruh, Monte Sereno, CA (US); Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 13/787,434

(22) Filed: Mar. 6, 2013

(65) Prior Publication Data
US 2014/0252209 A1   Sep. 11, 2014

(51) Int. Cl.
| H03K 17/945 | (2006.01) |
| G01J 1/42 | (2006.01) |
| G01V 8/20 | (2006.01) |
| G01S 7/481 | (2006.01) |
| G01S 17/02 | (2006.01) |

(52) U.S. Cl.
CPC .............. *G01J 1/4204* (2013.01); *G01S 7/481* (2013.01); *G01S 17/026* (2013.01); *G01V 8/20* (2013.01); *G01S 17/023* (2013.01)

(58) Field of Classification Search
CPC ..... H03K 17/941; H03K 17/945; H04B 1/587
USPC ........ 250/221, 222.1, 239, 551, 338.1, 338.4; 29/830, 832
See application file for complete search history.

(56) References Cited

U.S. PATENT DOCUMENTS

| 4,710,630 | A | 12/1987 | Kuppenheimer, Jr. et al. |
| 5,308,985 | A | 5/1994 | Lee |
| 6,835,923 | B2 | 12/2004 | Hamalainen et al. |
| 7,714,265 | B2 | 5/2010 | Fadell et al. |
| 7,728,316 | B2 | 6/2010 | Fadell et al. |
| 7,907,061 | B2 | 3/2011 | Lin et al. |
| 7,960,699 | B2 | 6/2011 | Chang et al. |
| 8,189,429 | B2 | 5/2012 | Chen et al. |
| 2011/0057108 | A1* | 3/2011 | Yao et al. .................. 250/338.4 |
| 2011/0086676 | A1 | 4/2011 | Choi et al. |
| 2011/0201381 | A1 | 8/2011 | Herz et al. |
| 2012/0132788 | A1 | 5/2012 | Findlay |
| 2012/0132806 | A1 | 5/2012 | Findlay et al. |
| 2012/0153153 | A1 | 6/2012 | Chang et al. |
| 2012/0295665 | A1 | 11/2012 | Pantfoerder |
| 2012/0319592 | A1* | 12/2012 | Riesebosch .................. 315/152 |

OTHER PUBLICATIONS

International Search Report and Written Opinion of the International Searching Authority for corresponding International Application No. PCT/US2014/016135, mailing date Jun. 2, 2014, 9 pages.
International Preliminary Report on Patentability, PCT Application No. PCT/US2014/016135, (Sep. 17, 2015), 7 pages.

* cited by examiner

*Primary Examiner* — Kevin Pyo
(74) *Attorney, Agent, or Firm* — Blakely, Sokoloff, Taylor & Zafman LLP (57) ABSTRACT

A proximity and light sensing device including a radiation emitter for proximity sensing positioned on a substrate. The device further includes a radiation detector positioned on the substrate, the radiation detector configured to detect radiation from the emitter. An ambient light detector is also positioned on the substrate and around the radiation emitter so as to form a border around the radiation emitter and detect off-axis ambient light rays.

19 Claims, 11 Drawing Sheets

PROXIMITY SENSOR WITH COMBINED LIGHT SENSOR HAVING AN INCREASED VIEWING ANGLE

FIELD

An embodiment of the invention is directed to a light and proximity sensing device having an increased sensor viewing angle. Other embodiments are also described and claimed.

BACKGROUND

Portable handheld electronic devices, such as the iPhone® multifunction device by Apple Inc., have a touch screen in their front face, where an earpiece speaker or receiver used for telephony is located. When the device is being held against the user's ear during a phone call, a proximity function automatically senses this condition using an infrared proximity sensor that is built into the device, and on that basis turns off the touch sensitive display screen of the device. The proximity function can also automatically determine or measure when the device has moved away from the user's ear, in which case the touch screen is re-activated. This is achieved by measuring the signals of the infrared proximity sensor's emitter and complementary detector, where the emitter transmits an infrared signal that is reflected by a nearby object (e.g., the user's head) and picked up by the detector. A stronger received signal may be interpreted by the proximity function to mean that the object is closer, while a weaker received signal means the object is farther away.

In many instances, the proximity sensor is combined with an ambient light sensor (ALS) which senses ambient visible light intensity. An ambient light detector process uses the sensed visible light intensity to, for example, adjust the touch screen display lighting. The ALS should have a field of view (FOV) and viewing angle which is larger than that of the proximity sensor, so that light from all different directions can be detected. When the proximity sensing device and the ALS device are packaged very close together, however, the FOV and viewing angle of the ALS may be limited to that of the proximity sensing device.

SUMMARY

An embodiment of the invention is directed to a light and proximity sensing device having an increased ambient light viewing angle. To achieve the proximity function, the proximity and light sensing device may include a first compartment having a radiation emitter positioned on a substrate and an optical element positioned over the radiation emitter. A second compartment may further be provided which includes a radiation detector positioned on the substrate and an optical element aligned with an optical path to the detector. A mid wall is positioned between the first compartment and the second compartment to prevent cross talk between the emitter and detector.

The ALS function, with an increased viewing angle, may be provided by an ambient light detector positioned around one or both of the radiation emitter and the radiation detector such that it forms an ambient light detector border around the radiation emitter and/or the radiation detector. Since the ambient light detector extends outside of the radiation emitter and/or detector, it forms a wider viewing angle than the radiation emitter and/or detector. In some embodiments, the ambient light detector is configured to have a viewing angle capable of capturing rays which are more than 20 degrees off-axis with respect to an optical axis, for example, from about 20 degrees to 45 degrees off-axis. In some embodiments, the off-axis rays are East off-axis rays, meaning they are off-axis in the East direction. In other embodiments, ambient light detector is configured to detect off-axis rays in many different directions, for example, East off-axis rays, West off-axis rays, North off-axis rays and/or South off-axis rays. It is further contemplated that in some embodiments, the radiation emitter and/or the radiation detector may have the ALS function incorporated therein, such as by integrating an ambient light photodetector therein, to further enhance ALS performance of the device within which the sensing device is implemented.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Figure 1A:
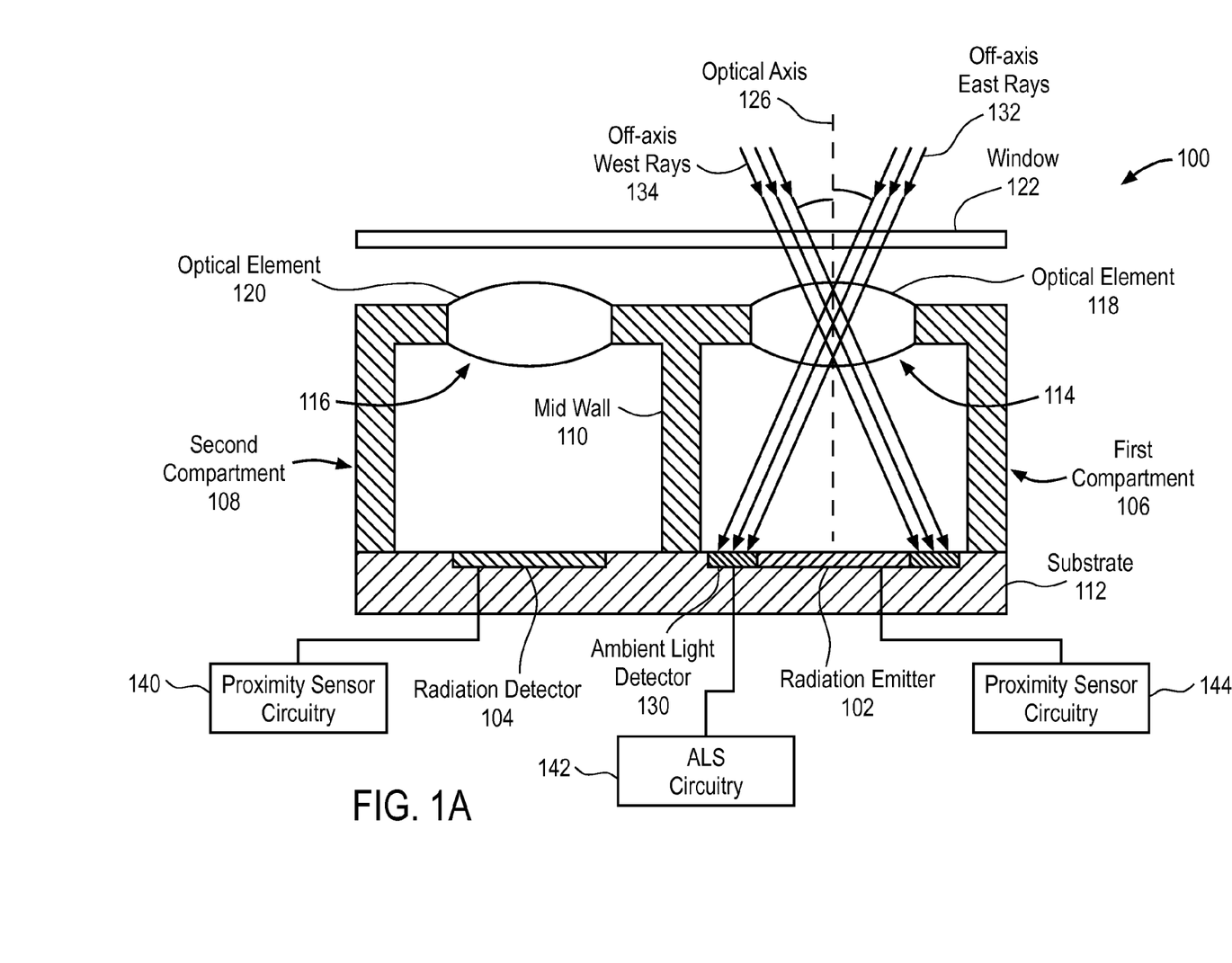
FIG. 1A is a cross-sectional side view of one embodiment of a sensing device.

FIG. 1A is a cross-sectional side view of one embodiment of a sensing device. In the illustrated embodiment, sensing device 100 includes a radiation emitter 102 and a radiation detector 104. The radiation emitter 102 may generate and emit radiation in, for example, the infrared (IR) bands. Representatively, radiation emitter 102 may be a semiconductor radiation source such as a light emitting diode (LED). The radiation detector 104 may be configured to detect changes in the intensity of radiation emitted from radiation emitter 102. In this aspect, radiation detector 104 may provide a proximity sensor function. Representatively, radiation detector 104 may be a photodiode or other type of photodetector capable of sensing and converting IR radiation into a current or voltage that can then be processed by the device within which it is implemented.

In some embodiments, sensing device 100 may further include an ambient light detector 130 to provide an ALS function to sensing device 100. Ambient light detector 130 may detect an intensity of ambient light from the surrounding environment. For example, the ambient light detector 130 may sense an intensity of visible light within the environment, such as that from the sun or other indoor/outdoor lighting sources (e.g., light bulbs). Based on the intensity of light sensed, the device within which sensing device 100 is implemented may modify its operation (e.g., display screen functionality and/or lighting). The ambient light detector 130, however, requires a relatively wide viewing angle (e.g., at least ±30 degrees of the optical axis) to ensure that screen brightness is maintained as the user tilts or moves the device within which sensing device 100 is implemented. In some cases, this viewing angle may be wider than that desired for proper proximity sensor function of sensing device 100, which requires well-collimated optics.

To accommodate the competing optical requirements of the ALS function and the proximity function of sensing device 100, ambient light detector 130 may be positioned within sensing device 100 such that it has a viewing angle capable of capturing ambient light rays outside of a viewing angle of the proximity sensing components (e.g., radiation emitter 102 and/or radiation detector 104). Representatively, in one embodiment, ambient light detector 130 may be configured to detect East rays 132 which are off-axis to optical axis 126 as illustrated by angle ($\beta$) in an East direction (as viewed in FIG. 1A). Ambient light detector 130 may further be configured to detect West rays which are off-axis to optical axis 126 as illustrated by angle ($\alpha$) in a West direction (as viewed in FIG. 1A). It is to be understood that the terms "off-axis ray" or "off-axis rays" are intended to refer to one or more incoming light rays which form, for example, an angle ($\beta$) or an angle ($\alpha$) with respect to optical axis 126. In other words, they are not parallel to optical axis 126.

In some embodiments, the off-axis angles $\beta$ and $\alpha$ of East rays 132 and West rays 134, respectively, may be at least 20 degrees off-axis, for example, at least 30 degrees off-axis, and in some cases, from about 15 degrees off-axis to about 45 degrees off-axis, for example, from 25 degrees to 35 degrees off-axis. Such off-axis rays of this degree are typically difficult to detect due to the collimated optics needed for proximity function, which often times prevents the detection of light rays more than 20 degrees off-axis. Due to the increased viewing angle of ambient light detector 130, the ALS function can be added to the proximity sensing function of sensing device 100 without changing the overall design packaging to accommodate the ALS requirements.

Figure 1B:
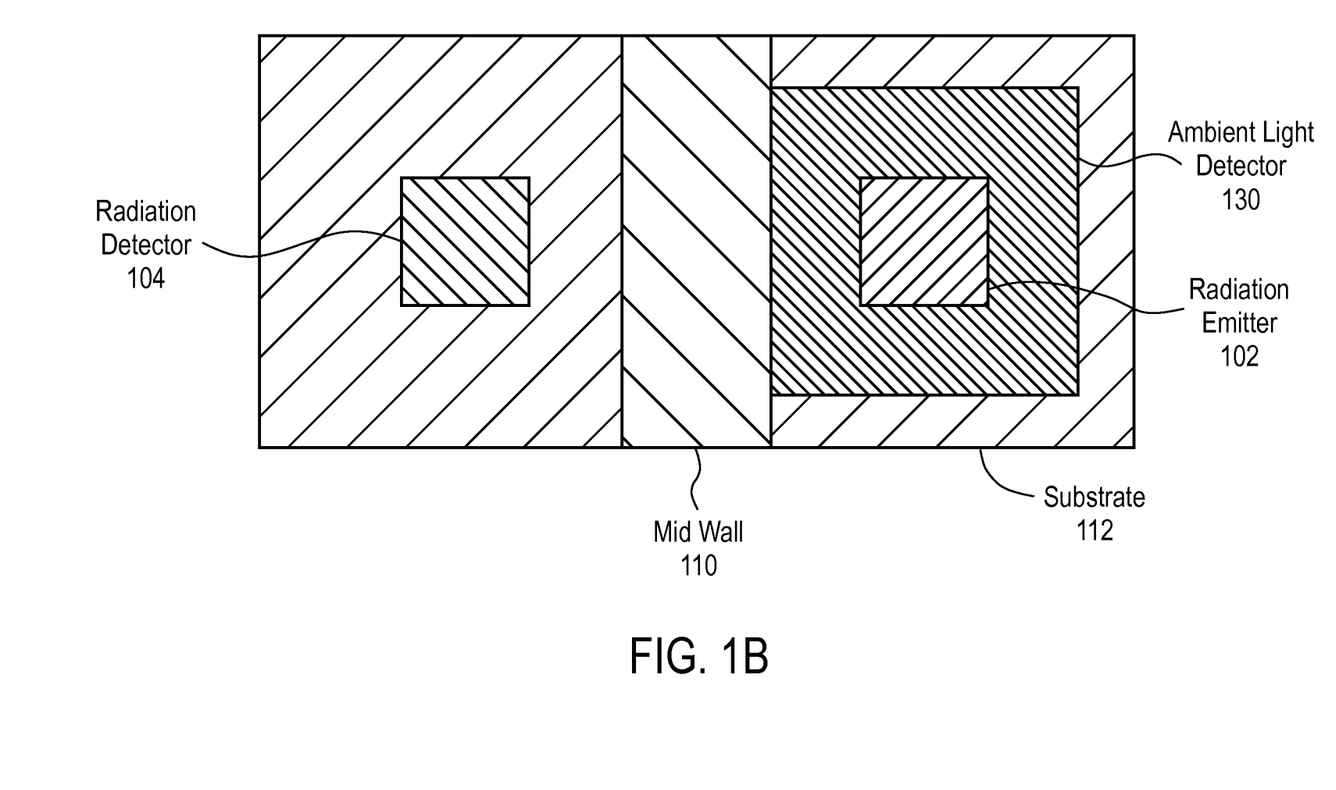
FIG. 1B is a top view of one aspect of the sensing device of FIG. 1A.

In one embodiment, the wide viewing angle of ambient light detector 130 may be achieved by positioning ambient light detector 130 entirely around radiation emitter 102. In this aspect, ambient light detector 130 forms a border or frame around radiation emitter 102 as illustrated in FIG. 1B. FIG. 1B shows a top view of one arrangement of the ambient light detector 130, radiation emitter 102 and radiation detector 104. It is noted that since ambient light detector 130 is positioned around all sides of radiation emitter 102, in addition to East and West off-axis rays, it may further be capable of detecting North and South off-axis rays. In some embodiments, depending upon the dimensions of radiation emitter 102, ambient light detector 130 may form a substantially square shaped frame structure having an overall footprint length and width of from about 0.5 mm to about 0.8 mm, for example, from 0.6 mm to 0.7 mm, representatively, 0.65 mm. Alternatively, ambient light detector 130 may be positioned around only a portion of radiation emitter 102 where ambient light detection is desired. For example, ambient light detector 130 may be formed around only one side, two sides, or three sides of radiation emitter 102. In any case, since ambient light detector 130 is positioned outside of radiation emitter 102, it forms a wider viewing angle than that of radiation emitter 102 as will be described in more detail in reference to FIG. 1C.

It is further to be understood that in addition to the positioning of ambient light detector 130, its width around radiation emitter 102 may further have an effect on the ambient light rays that can be sensed. In other words, increasing a width of ambient light detector 130 may increase the viewing angle while decreasing the width may decrease the viewing angle. In this aspect, in some embodiments, ambient light detector 130 may extend all the way from a side of radiation emitter 102, which faces mid wall 110, to mid wall 110 to allow for optimal off-axis East ray detection. It is further noted that ambient light detector 130 may be a photodiode or other type of photodetector capable of sensing and converting visible light into a current or voltage that can then be processed by the device within which it is implemented. Since ambient light detector 130 detects or senses visible light, IR radiation emitted from radiation emitter 102 will not interfere with the ALS function.

It is further to be understood that in some embodiments, radiation detector 104 may also be capable of detecting ambient light so as to enhance an ALS performance of sensing device 100. For example, radiation detector 104 may have both radiation detecting sensors and ambient light detecting sensors incorporated therein. In this aspect, ambient light detector 130 can be used to detect the wide angle off-axis ambient light rays and the additional ambient light sensor incorporated within radiation detector 104 can detect rays within the viewing angle of the proximity sensing components (e.g., rays less than about 20 degrees off-axis) such that both ambient light rays within and outside of the collimated optics of sensing device 100 can be detected.

Returning briefly to the overall assembly of each of the ALS and proximity sensing components within sensing device 100, in some embodiments, radiation emitter 102 and ambient light detector 130 may be mounted or formed within a portion of a substrate 112 within a first compartment 106 formed over substrate 112. Radiation detector 104 may be mounted or formed within a portion of substrate 112 within a second compartment 108. In one embodiment, substrate 112 is a printed circuit board (PCB) having traces, wire bond pads and vias disposed thereon or therein to facilitate transfer of electrical signals between radiation emitter 102, radiation detector 104 and ambient light detector 130 and the electronic device within which sensing device 100 is implemented. Radiation emitter 102 may also be electrically coupled to proximity sensor circuitry 144 and radiation detector 104 may be electrically coupled to proximity sensor circuitry 140.

In addition, ambient light detector 130 may be electrically coupled to ALS circuitry 142. The circuitry may be signal processing circuitry that allows signals associated with the radiation emitter 102, ambient light detector 130 and/or radiation detector 104 to be used by the electronic device to modify its operation (e.g., turn a display screen off).

The first and second compartments 106, 108 may be formed on opposing sides of a mid wall 110. Mid wall 110 extends from substrate 112 and prevents cross talk between emitter 102 and detector 104. Cross talk refers to an occurrence in which stray light from an emitter is detected by the detector thereby causing an undesired false signal mimicking a true proximity or object detection signal. Mid wall 110 may therefore be made of any type of material capable of blocking emitter stray signals from the detector, for example, a ceramic, a metal, a polyimide or other similar material opaque to IR radiation.

Sensing device 100 may further include optical element 118 and optical element 120. Optical elements 118, 120 may be lenses fitted within openings 114, 116 formed within a top wall of each of compartments 106, 108. Optical element 118 is positioned over radiation emitter 102 such that light emitted from radiation emitter 102 passes through optical element 118 to the ambient environment. Optical element 118 may further be positioned over ambient light detector 130 such that ambient or visible light from the outside environment can pass through optical element 118 to ambient light detector 130. Optical element 120 is positioned over radiation detector 104 such that radiation from emitter 102, which is reflected off a nearby object, can pass through optical element 120 to radiation detector 104. Each optical element 118, 120 may be configured to transmit and refract the incoming or outgoing light beams in the desired direction. For example, in some embodiments, optical elements 118, 120 may be drum lenses which can concentrate the transmitted light and therefore increase the amount of light focused at the nearby object or radiation detector 104. This is particularly advantageous in the case of proximity detection because it can increase proximity detection distances. It is to be understood, however, that although exemplary optical elements are described herein, such features are optional and may be omitted in some embodiments.

In some embodiments, a window 122 may further be positioned over radiation emitter 102, radiation detector 104 and ambient light detector 130. Window 122 may be formed from a translucent or semi-translucent material such that it does not substantially modify the optical characteristics of sensing device 100. Window 122 may be part of sensing device 100 or formed as part of the portable electronic device in which sensing device 100 is implemented.

Figure 1C:
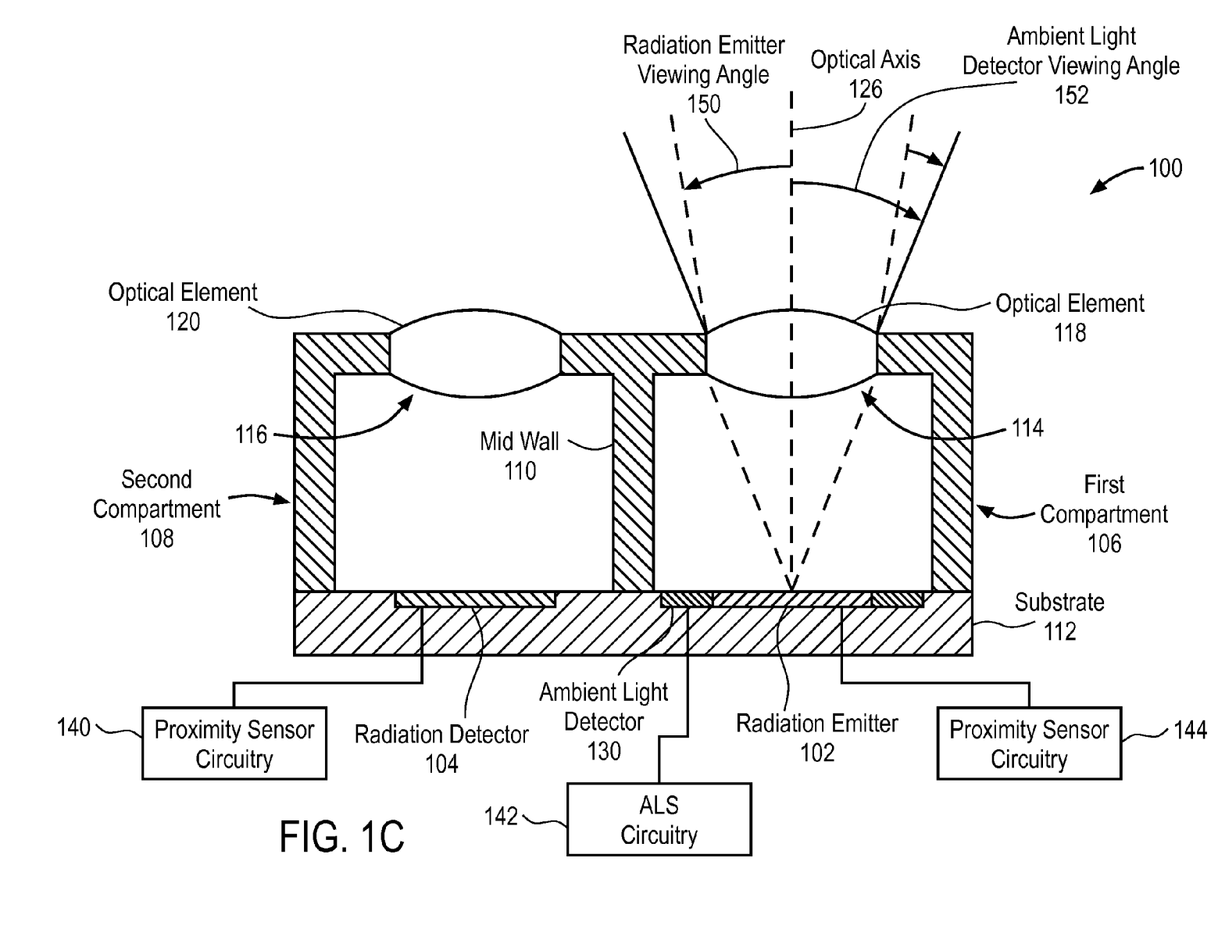
FIG. 1C is a cross-sectional side view of one aspect of the sensing device of FIG. 1A.
Figure 1D:
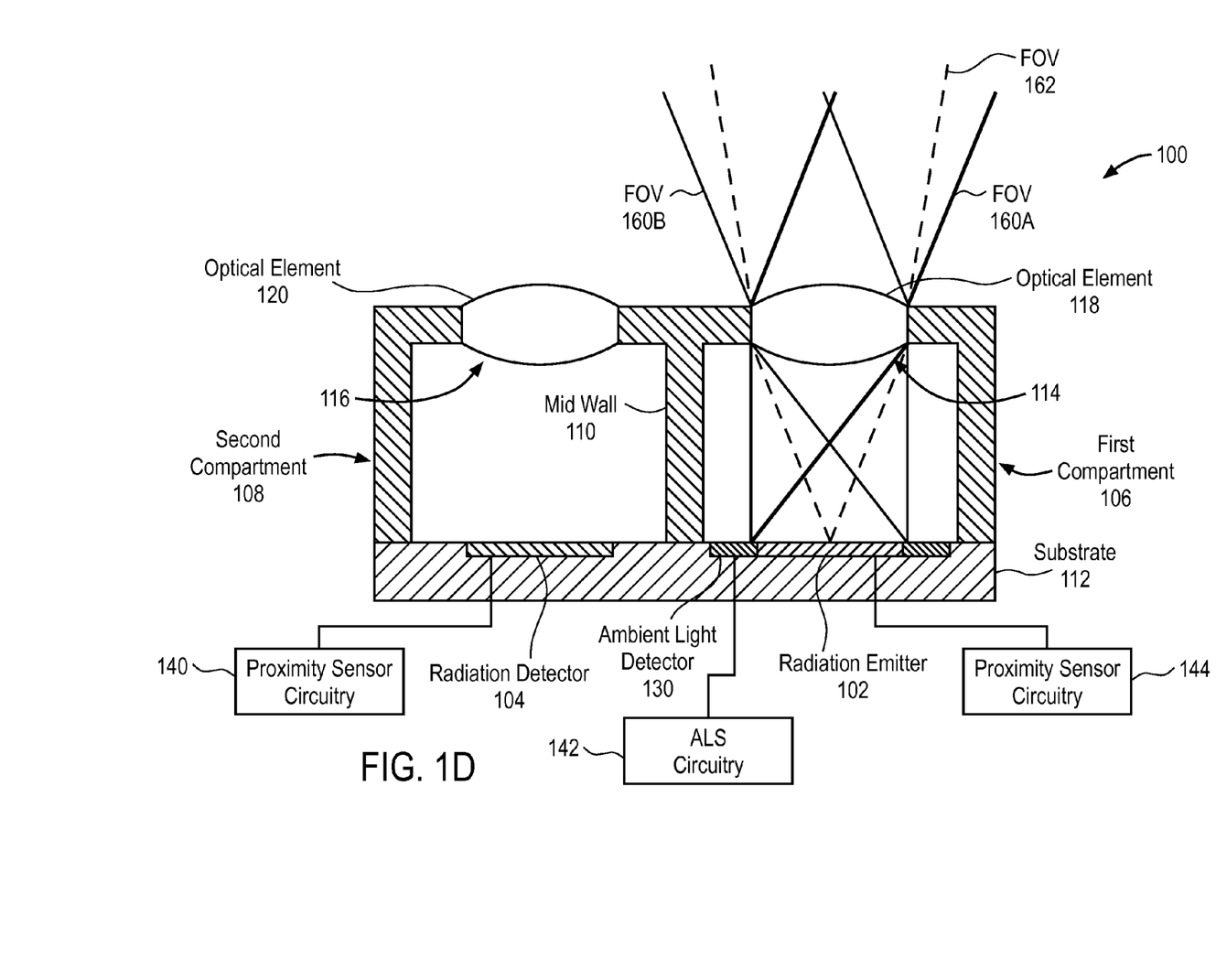
FIG. 1D is a cross-sectional side view of one aspect of the sensing device of FIG. 1A.

Returning now to the viewing angle of ambient light detector 130, such viewing angle may be better understood by comparing the viewing angle of ambient light detector 130 and the viewing angle of radiation emitter 102. Such a comparison is illustrated in FIG. 1C. In particular, FIG. 1C illustrates the wider viewing angle of ambient light detector 130. As previously discussed, in the case of ALS, it is desirable for ambient light detector 130 to be able to sense or detect incoming light from all different directions. In other words, it is desirable for ambient light sensor 130 to have a wider viewing angle than radiation emitter 102, for which more collimated optics are desired. The term "viewing angle" refers to an angle of the cone defining the sensor's field of view (FOV). It is to be understood that the term "field of view" or "FOV" is used generally herein to refer to the area that is visible from the view point of a particular sensor. FIG. 1D illustrates the ambient light detector FOV 160A and 160B, in comparison to the radiation emitter FOV 162, which have been omitted from FIG. 1C for purposes of clarity.

For proximity detection, however, sensing device 100 does not require such a wide viewing angle. The performance of the ALS function may therefore be compromised when, for example, the ALS is integrated within the existing proximity sensor packaging, which is designed with a narrower viewing angle in mind. Moreover, even where the packaging is designed for an integrated ALS and proximity sensing system, the FOV and viewing angle may be limited by the size of the opening (e.g., opening 114 and opening 116) through which the incoming light beams travel and, in some cases, the associated optical element (e.g., optical element 118 or optical element 120). This is particularly true with small portable devices such as cellular telephones in which the sensing device 100 package may be confined to, for example, an approximately 2.4 mm by 2.7 mm square footprint. In addition, due to the relatively small package size, radiation emitter 102, ambient light detector 130 and radiation detector 104 are confined to a size no larger than their respective compartment sizes.

As a result, off-axis rays (e.g., off-axis rays 132 and 134 illustrated in FIG. 1A), which are off-axis with respect to an optical axis 126 of optical element 118, in some cases around 30 degrees, may be outside of the relatively narrow viewing angle 150 of radiation emitter 102, which typically has a viewing angle less than 20 degrees. Since ambient light detector 130, however, is positioned around radiation emitter 102 as illustrated, it has a wider viewing angle 152 than that of radiation emitter 102 as illustrated by angle ($\Delta$). For example, in some cases, the radiation emitter viewing angle 150 may be less than 20 degrees and the ambient light detector viewing angle 152 may be from about 20 degrees to about 45 degrees. In such cases, angle ($\Delta$) may be from about 0 degrees to about 25 degrees, for example, from about 10 to about 20 degrees or about 15 degrees. In other words, the ambient light detector viewing angle 152 is anywhere from 0 to about 25 degrees greater than that of radiation emitter viewing angle 150, and therefore ambient light detector 130 can detect light rays having an off-axis angle anywhere from 0 to 25 degrees outside of a FOV (e.g., FOV 162 illustrated in FIG. 1D) of radiation emitter 102.

Figure 2A:
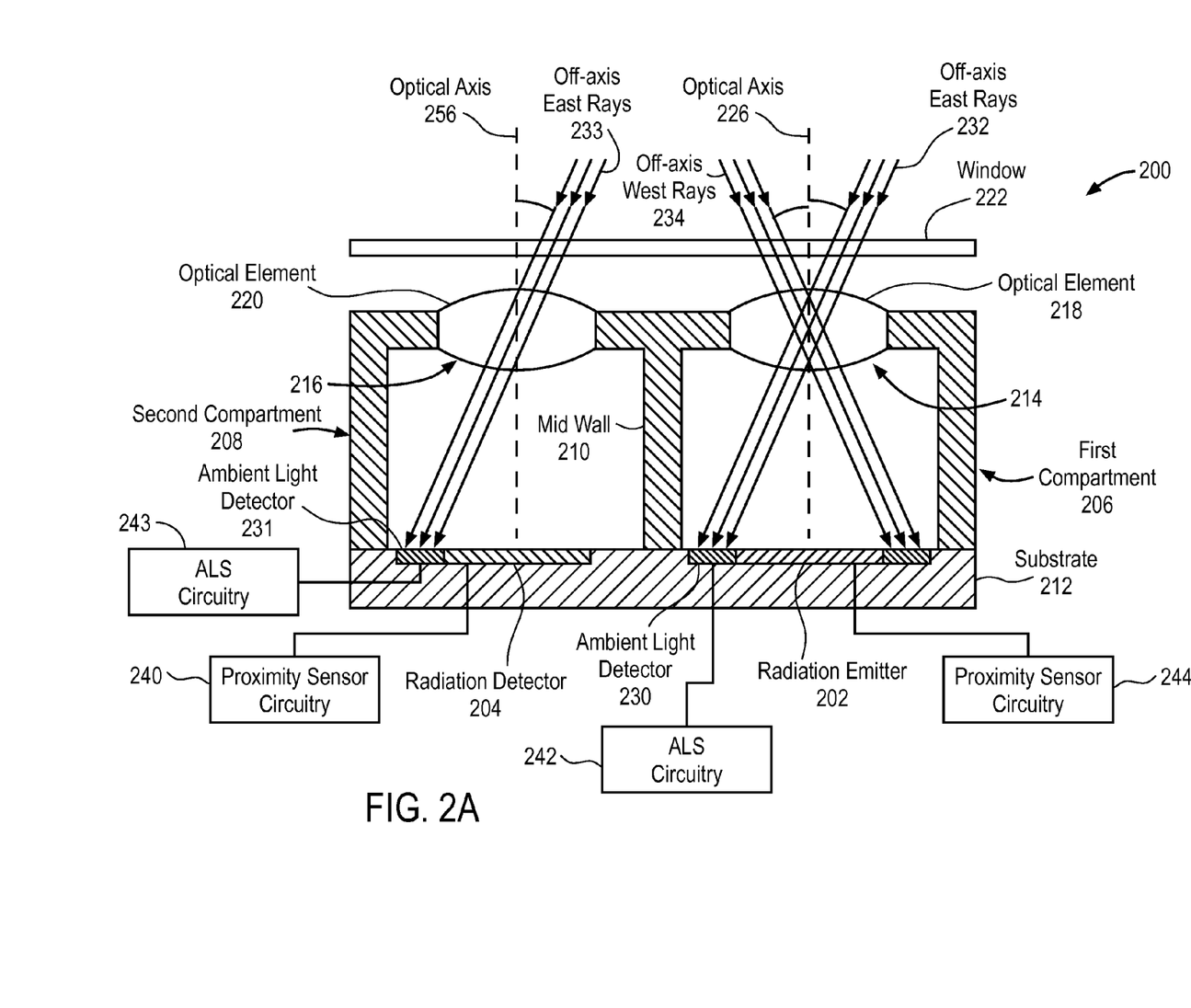
FIG. 2A is a cross-sectional side view of another embodiment of a sensing device.

FIG. 2A is a cross-sectional side view of another embodiment of a sensing device. Sensing device 200 is substantially similar to sensing device 100 except that in this embodiment, sensing device 200 includes an additional ambient light detector 231 positioned near radiation detector 204 to enhance ALS function. Representatively, sensing device 200 includes a radiation emitter 202 and a radiation detector 204. The radiation emitter 202 may generate and emit radiation in, for example, the infrared (IR) bands. For example, radiation emitter 202 may be a semiconductor radiation source such as a light emitting diode (LED). The radiation detector 204 may be configured to detect changes in the intensity of radiation emitted from emitter 202. In this aspect, radiation detector 204 may provide a proximity sensing function. Representatively, radiation detector 204 may be a photodiode or other type of photodetector capable of sensing and converting IR radiation into a current or voltage that can then be processed by the device within which it is implemented.

Sensing device 200 may further include an ambient light detector 230 and an ambient light detector 231 to provide an ALS function to sensing device 200. Ambient light detectors 230, 231 may detect an intensity of ambient light from the surrounding environment. For example, the ambient light detectors 230, 231 may sense an intensity of visible light within the environment, such as that from the sun or other indoor/outdoor lighting sources (e.g., light bulbs). Based on the intensity of light sensed, the device within which sensing device 200 is implemented, may modify its operation (e.g., display screen functionality and/or lighting). As previously discussed, however, for optimal ALS performance, it is desirable for ambient light detectors 230, 231 to have a relatively wide viewing angle (e.g., at least ±30 degrees of the optical axis) to ensure, for example, that screen brightness is maintained as the user tilts or moves the device within which sensing device 200 is implemented. The desired viewing angle may, however, be wider than that desired for proper proximity sensor function of sensing device 200.

To accommodate the competing optical requirements of the ALS function and the proximity function of sensing device 200, ambient light detector 230 may be similar to ambient light detector 130 previously discussed in reference to FIG. 1A in that it is positioned around radiation emitter 202. In this aspect, ambient light detector 230 has a viewing angle sufficient to capture East rays 132 which are off-axis to optical axis 226 as illustrated by angle (β') in an East direction (as viewed in FIG. 2A). Ambient light detector 230 may further be configured to detect West rays which are off-axis to optical axis 226 as illustrated by angle (α') in a West direction (as viewed in FIG. 2A). In some embodiments, the off-axis angles β' and α' of East rays 232 and West rays 234, respectively, may be at least 20 degrees off-axis, for example, at least 30 degrees off-axis, and in some cases, from about 15 degrees off-axis to about 45 degrees off-axis, for example, from 30 degrees to 35 degrees off-axis.

To further enhance off-axis ray detection, ambient light detector 231 may be positioned near radiation detector 204. In some embodiment, ambient light detector 231 may be configured to have a viewing angle sufficient to capture East rays 233 which are off-axis to optical axis 256 as illustrated by angle (θ) in an East direction (as viewed in FIG. 2A). In some embodiments, the off-axis angle of East rays 233 may be at least 20 degrees off-axis, for example, at least 30 degrees off-axis, and in some cases, from about 15 degrees off-axis to about 45 degrees off-axis, for example, from 30 degrees to 35 degrees off-axis. Thus, ambient light detector 231 may have a viewing angle sufficient to capture off-axis rays within a range of from about 20 degrees to about 40 degrees off-axis.

Figure 2B:
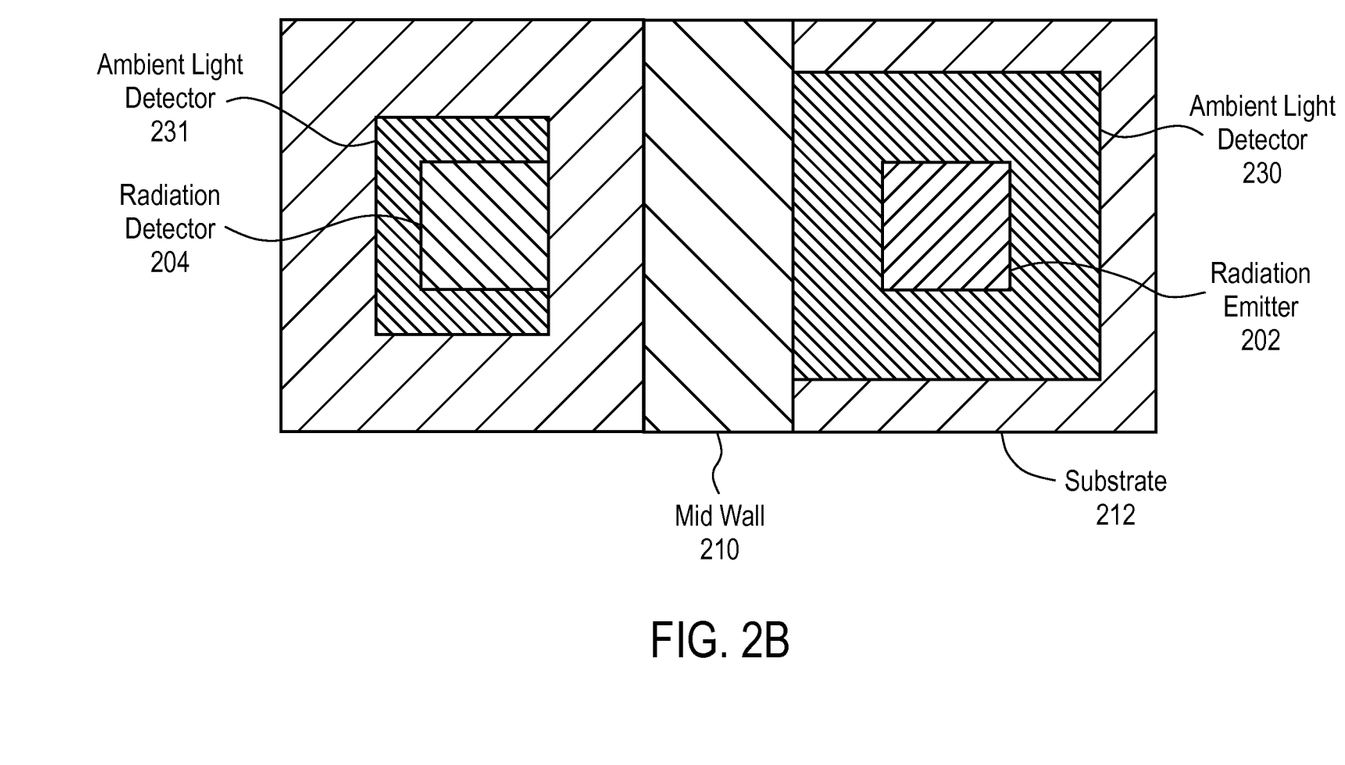
FIG. 2B is a top view of one aspect of the sensing device of FIG. 2A.

In one embodiment, the wide viewing angle, particularly to East off-axis rays, of ambient light detector 231 may be achieved by positioning ambient light detector 231 within a path of East off-axis rays 233. Representatively, ambient light detector 231 may be positioned along a left side of radiation detector 204 (e.g., a side between radiation detector 204 and the outer wall as viewed in FIG. 2A). Ambient light detector 231 may also extend around the top and bottom sides of radiation detector 204 as viewed in FIG. 2B such that it forms a substantially "c" shaped structure to allow for detection of North and South off-axis rays. FIG. 2B shows a top view of one arrangement of the ambient light detectors 230, 231, radiation emitter 202 and radiation detector 204. Alternatively, ambient light detector 231 may be positioned around the entire radiation detector 204 such that it forms a border around radiation detector 204 and can detect off-axis rays from many different directions (e.g., East, West, South and North off-axis rays). In any case, since ambient light detector 231 is positioned outside of radiation detector 204, it forms a wider viewing angle than that of radiation detector 204 as will be described in more detail in reference to FIG. 2C. It is further noted that ambient light detectors 230 and 231 may be photodiodes or another type of photodetector capable of sensing and converting visible light into a current or voltage that can then be processed by the device within which it is implemented. Since ambient light detectors 230 and 231 detect or sense visible light, IR radiation emitted from radiation emitter 202 will not interfere with the ALS function.

It is further to be understood that, in some embodiments, radiation detector 204 may also be capable of detecting ambient light so as to enhance an ALS performance of sensing device 200. For example, radiation detector 204 may have both radiation detecting sensors and ambient light detecting sensors incorporated therein. In this aspect, ambient light detectors 230 and 231 can be used to detect the wide angle off-axis ambient light rays and the additional ambient light sensor incorporated within radiation detector 204 can detect rays within the viewing angle of the proximity sensing components (e.g., rays less than about 20 degrees off-axis) such that both ambient light rays within and outside of the collimated optics of sensing device 200 can be detected.

Returning briefly to the overall assembly of each of the ALS and proximity sensing components within sensing device 200, in some embodiments, radiation emitter 202 and ambient light detector 230 may be mounted or formed within a portion of a substrate 212 within a first compartment 206 formed over substrate 212. Radiation detector 204 may be mounted or formed within a portion of substrate 212 within a second compartment 208. In one embodiment, substrate 212 is a printed circuit board (PCB) having traces, wire bond pads and vias disposed thereon or therein to facilitate transfer of electrical signals between radiation emitter 202, radiation detector 204 and ambient light detectors 230, 231 and the electronic device within which sensing device 200 is implemented. Radiation emitter 202 may also be electrically coupled to proximity sensor circuitry 244 and radiation detector 204 may be electrically coupled to proximity sensor circuitry 240. In addition, ambient light detector 230 may be electrically coupled to ALS circuitry 242 and ambient light detector 231 may be electrically coupled to ALS circuitry 243. The circuitry may be signal processing circuitry that allows signals associated with the radiation emitter 202, ambient light detectors 230, 231 and radiation detector 204 to be used by the electronic device to modify its operation (e.g., turn a display screen off).

The first and second compartments 206, 208 may be formed on opposing sides of a mid wall 210. Mid wall 210 extends from substrate 212 and prevents cross talk between radiation emitter 202 and radiation detector 204. Cross talk refers to an occurrence in which stray light from an emitter is detected by the detector thereby causing an undesired false signal mimicking a true proximity or object detection signal. Mid wall 210 may therefore be made of any type of material capable of blocking emitter stray signals from the detector, for example, a ceramic, a metal, a polyimide or other similar material opaque to IR radiation.

Sensing device 200 may further include optical element 218 and optical element 220. Optical elements 218, 220 may be lenses fitted within openings 214, 216 formed within a top wall of each of compartments 206, 208. Optical element 218 is positioned over radiation emitter 202 such that light emitted from radiation emitter 202 passes through optical element 218 to the ambient environment. Optical element 218 may further be positioned over ambient light detector 230 such that ambient or visible light from the outside environment can pass through optical element 218 to ambient light detector 230. Optical element 220 is positioned over radiation detector 204 such that radiation from emitter 202, which is reflected off a nearby object, can pass through optical element 220 to radiation detector 204. Optical element 220 may further be positioned over ambient light detector 231 such that ambient or visible light from the outside environment can pass through optical element 220 to ambient light detector 231. Each optical element 218, 220 may be configured to transmit and refract the incoming or outgoing light beams in the desired direction. For example, in some embodiments, optical elements 218, 220 may be drum lenses which can concentrate the transmitted light and therefore increase the amount of light focused at the nearby object or radiation detector 204. This is particularly advantageous in the case of proximity detection because it can increase proximity detection distances. It is to be understood, however, that although exemplary optical elements are described herein, such features are optional and may be omitted in some embodiments.

In some embodiments, a window 222 may further be positioned over radiation emitter 202, radiation detector 204 and ambient light detectors 230, 231. Window 222 may be formed from a translucent or semi-translucent material such that it does not substantially modify the optical characteristics of sensing device 200. Window 222 may be part of sensing device 200 or formed as part of the portable electronic device in which sensing device 200 is implemented.

Figure 2C:
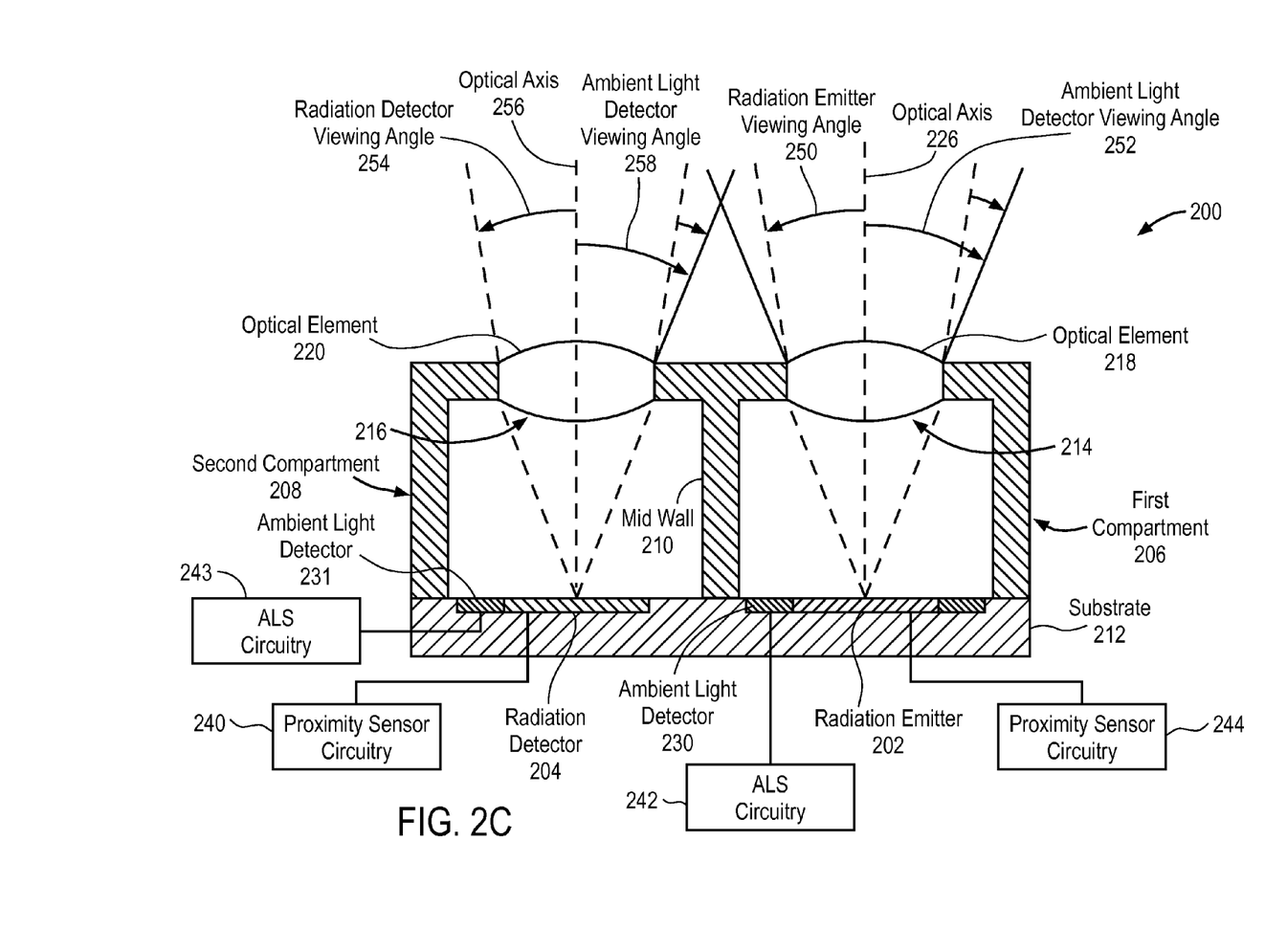
FIG. 2C is a cross-sectional side view of one aspect of the sensing device of FIG. 2A.

Returning now to the viewing angles of ambient light detectors 230 and 231, such viewing angles may be better understood by comparing the viewing angles of ambient light detectors 230 and 231 to radiation emitter 202 and radiation detector 204, respectively. Such a comparison is illustrated in FIG. 2C. In particular, FIG. 2C illustrates the wider viewing angle of ambient light detector 230 and ambient light detector 231. As previously discussed, in the case of ALS, it is desirable for ambient light detectors 230 and 231 to be able to sense or detect incoming light coming from all different directions. In other words, it is desirable for ambient light sensors 230 and 231 to have a wider viewing angle than radiation emitter 202 and radiation detector 204.

Figure 2D:
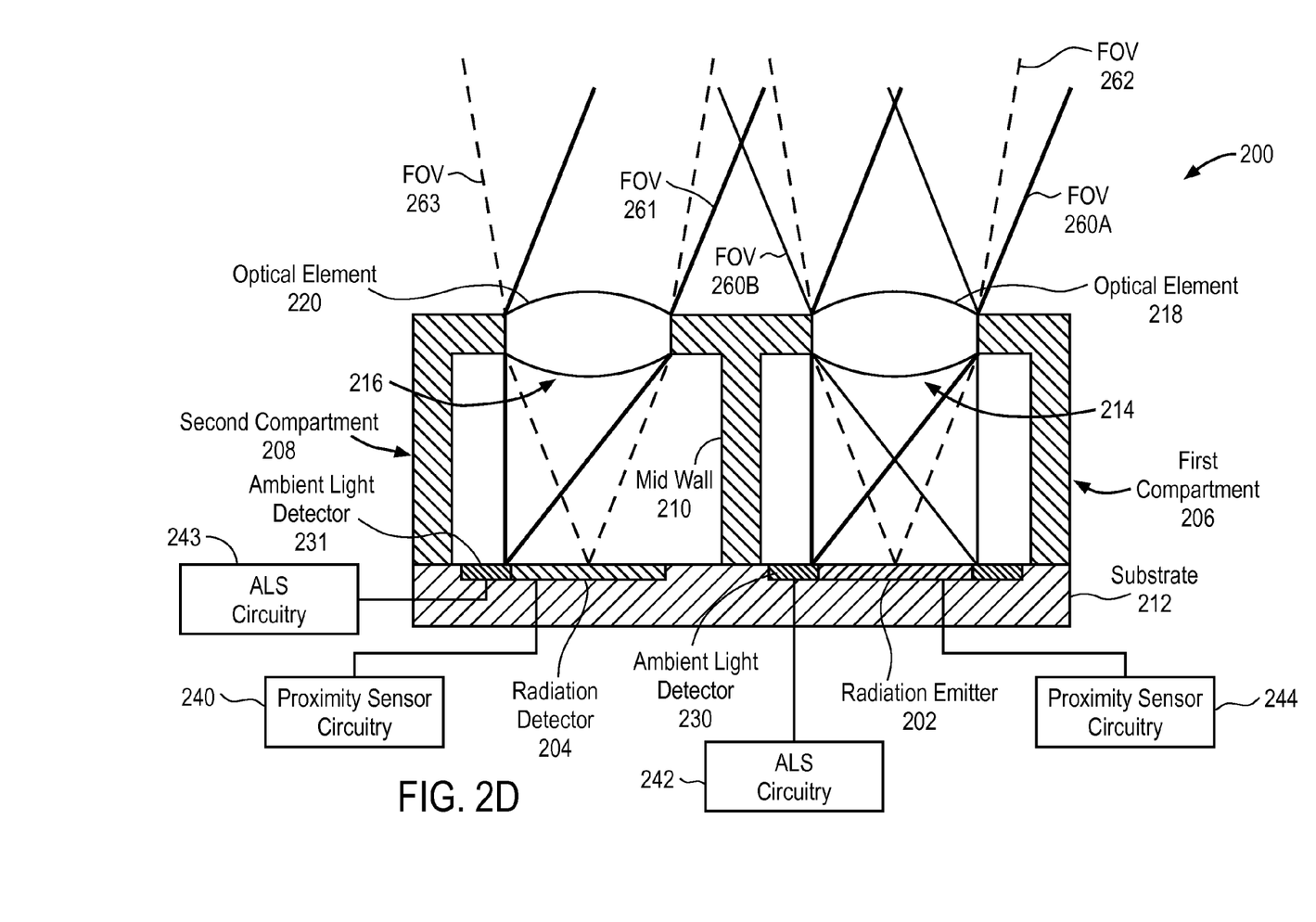
FIG. 2D is a cross-sectional side view of one aspect of the sensing device of FIG. 2A.

Since ambient light detector 230 is positioned around radiation emitter 202 as illustrated, it has a wider viewing angle 252 than that of radiation emitter 202 as illustrated by angle (Δ'). For example, in some cases, the ambient light detector viewing angle 252 may be from about 20 degrees to about 45 degrees. In such cases, angle (Δ') may be from about 0 degrees to about 25 degrees, for example, from about 10 to about 20 degrees or about 15 degrees. In other words, the ambient light detector viewing angle 252 is anywhere from 0 to about 25 degrees greater than that of radiation emitter viewing angle 250, and therefore ambient light detector 230 can detect light rays having an off-axis angle anywhere from 0 to 25 degrees outside of a FOV of radiation emitter 202. FIG. 2D illustrates the FOV 260A and 260B of ambient light detector 230, in comparison to the FOV 262 of radiation emitter 202, which have been omitted from FIG. 2C for purposes of clarity.

In addition, ambient light detector 231 has a wider viewing angle 258 with respect to East off-axis rays than that of radiation detector 204 as illustrated by angle (Δ"). For example, in some cases, the ambient light detector viewing angle 258 may be from about 20 degrees to about 45 degrees, with respect to optical axis 256. In such cases, angle (Δ") may be from about 0 degrees to about 25 degrees, for example, from about 10 to about 20 degrees or about 15 degrees. In other words, the ambient light detector viewing angle 258 is anywhere from 0 to about 25 degrees greater in the East direction than that of radiation detector viewing angle 254 (which is typically less than about 20 degrees), and therefore ambient light detector 231 can detect light rays having an off-axis angle anywhere from 0 to 25 degrees outside of a FOV of radiation detector 204. FIG. 2D illustrates the FOV 261 of ambient light detector 231, in comparison to the FOV 263 of radiation detector 204, which have been omitted from FIG. 2C for purposes of clarity.

Figure 3:
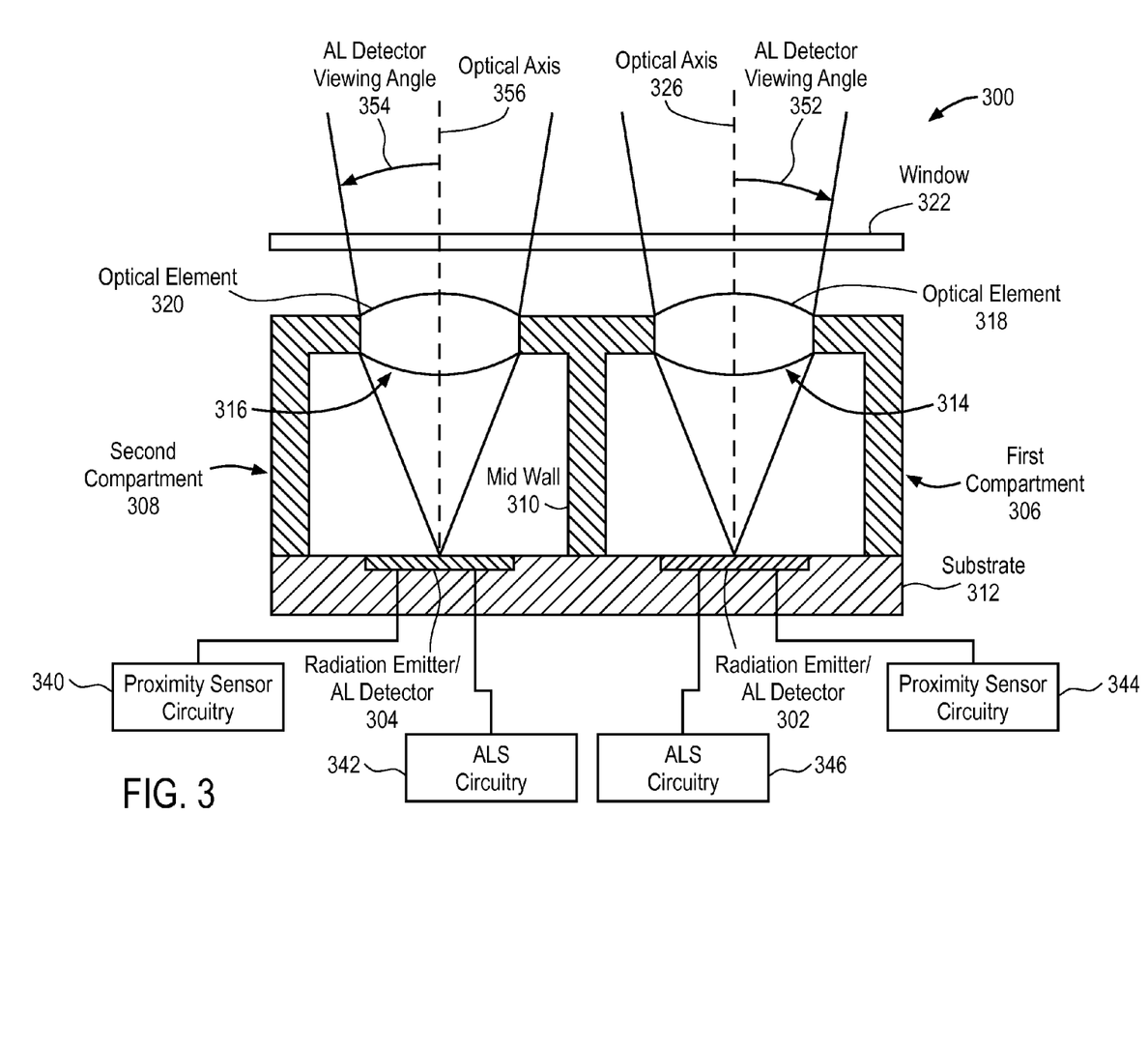
FIG. 3 is a cross-sectional side view of another embodiment of a sensing device.

FIG. 3 is a cross-sectional side view of another embodiment of a sensing device. Sensing device 300 is substantially similar to sensing devices 100 and 200 except that in this embodiment, an ambient light detector is incorporated into both the radiation emitter and the radiation detector. In particular, sensing device 300 includes a radiation emitter/ambient light detector module 302 within first compartment 306 and a radiation detector/ambient light detector module 304 within second compartment 308. The radiation emitter/ambient light detector module 302 may generate and emit radiation in, for example, the infrared (IR) bands. For example, radiation emitter/ambient light detector module 302 may include a semiconductor radiation source such as a light emitting diode (LED). Radiation emitter/ambient light detector module 302 may also include an ambient light detecting source such as a photodiode or other type of photodetector that is capable of detecting ambient light (e.g., light within a visible wavelength). Alternatively, or additionally, the radiation emitter/ambient light detector module 302 may include an LED which can operate as both a light emitter and a photodetector. Since both the radiation emitter and the ambient light detector are implemented within a single radiation emitter/ambient light detector module 302, they will have substantially the same viewing angle and FOV. This means that due to the collimated optics of sensing device 300, the ambient light detector viewing angle 352 may be within a relatively narrow angle range of from about 0 degrees to about 20 degrees with respect to optical axis 326.

To compensate for this narrower viewing angle, a second ambient light detecting functionality may be provided by the radiation detector/ambient light detector module 304 within second compartment 308. The radiation detector/ambient light detector 304 may be configured to detect changes in the intensity of radiation emitted from radiation emitter/ambient light detector module 302 as well as ambient light outside of sensing device 300. In this aspect, radiation detector/ambient light detector module 304 may provide a proximity sensing function as well as an ambient light sensing function. Representatively, radiation detector/ambient light detector module 304 may include one or more photodiodes or other type of photodetectors capable of sensing and converting IR radiation into a current or voltage that can then be processed by the device within which it is implemented, as well as one or more photodiodes capable of sensing and converting ambient light into a current or voltage for processing by the device. Since both the radiation detector and the ambient light detector are implemented within a single radiation detector/ambient light detector module 304, they will have substantially the same viewing angle and FOV. The ambient light detector viewing angle 354 of radiation detector/ambient light detector module 304 may therefore be similar to viewing angle 352 (e.g., from about 0 degrees to about 20 degrees with respect to optical axis 356). Nevertheless, since ambient light detection occurs within two different sides of sensing device 300, it is believed that a sufficient amount of light may be captured for proper ALS function. In addition, where detection of off-axis rays having an angle greater than about 20 degrees with respect to an optical axis is desired, any of the previously discussed ambient light detector configurations may be implemented within sensing device 300. For example, an additional ambient light detector bordering radiation emitter/ambient light detector module 302 and radiation detector/ambient light detector module 304 as previously discussed may be provided to facilitate detection of light rays off-axis by more than 20 degrees.

Returning briefly to the overall assembly of each of the ALS and proximity sensing components within sensing device 300, in some embodiments, radiation emitter/ambient light detector module 302 may be mounted or formed within a portion of a substrate 312 within a first compartment 306 formed over substrate 312. Radiation detector/ambient light detector module 304 may be mounted or formed within a portion of substrate 312 within a second compartment 308. In one embodiment, substrate 312 is a printed circuit board (PCB) having traces, wire bond pads and/or vias disposed thereon or therein to facilitate transfer of electrical signals between radiation emitter/ambient light detector module 302 and radiation detector/ambient light detector 304 and the electronic device within which sensing device 300 is implemented. Radiation emitter/ambient light detector module 302 may also be electrically coupled to proximity sensor circuitry 344 and ALS circuitry 346. Radiation detector/ambient light detector module 304 may be electrically coupled to proximity sensor circuitry 340 and ALS circuitry 342. The circuitry may be signal processing circuitry that allows signals associated with the radiation emitter/ambient light detector 302 and the radiation detector/ambient light detector 304 to be used by the electronic device to modify its operation (e.g., turn a display screen off).

The first and second compartments 306, 308 may be formed on opposing sides of a mid wall 310. Mid wall 310 extends from substrate 312 and prevents cross talk between radiation emitter/ambient light detector 302 and the radiation detector/ambient light detector 304. Mid wall 310 may therefore be made of any type of material capable of blocking emitter stray signals from the detector, for example, a ceramic, a metal, a polyimide or other similar material opaque to IR radiation.

Sensing device 300 may further include optical element 318 and optical element 320. Optical elements 318, 320 may be lenses fitted within openings 314, 316 formed within a top wall of each of compartments 306, 308. Optical element 318 is positioned over radiation emitter/ambient light detector module 302 such that light emitted from radiation emitter/ambient light detector 302 passes through optical element 318 to the ambient environment and ambient light can pass from the ambient environment to radiation emitter/ambient light detector module 302. Optical element 320 is positioned over radiation detector/ambient light detector module 304 such that radiation from radiation emitter/ambient light detector module 302, which is reflected off a nearby object, can pass through optical element 320 to radiation detector/ambient light detector module 304 as can light from the ambient environment. Each optical element 318, 320 may be configured to transmit and refract the incoming or outgoing light beams in the desired direction. For example, in some embodiments, optical elements 318, 320 may be drum lenses which can concentrate the transmitted light and therefore increase the amount of light focused at the nearby object or radiation detector/ambient light detector 304. This is particularly advantageous in the case of proximity detection because it can increase proximity detection distances. It is to be understood, however, that although exemplary optical elements are described herein, such features are optional and may be omitted in some embodiments.

In some embodiments, a window 322 may further be positioned over radiation emitter/ambient light detector module 302 and radiation detector/ambient light detector module 304. Window 322 may be formed from a translucent or semi-translucent material such that it does not substantially modify the optical characteristics of sensing device 300. Window 322 may be part of sensing device 300 or formed as part of the portable electronic device in which sensing device 300 is implemented.

Figure 4:
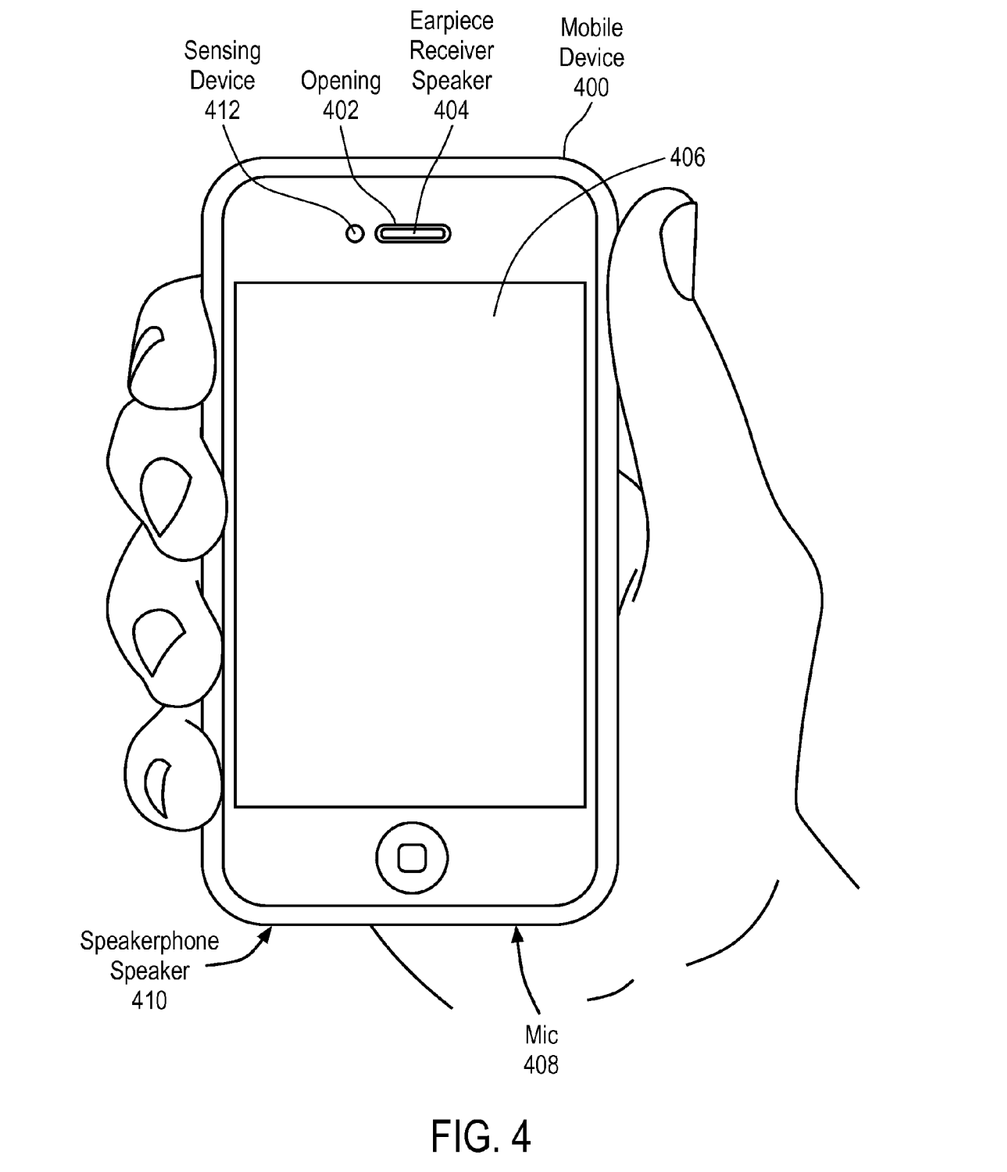
FIG. 4 is a perspective view of a handheld device within which embodiments of a sensing device may be implemented.

Turning now to FIG. 4, this figure depicts an example embodiment of a portable handheld device 400 having a sensing device 412 implemented therein. Sensing device 412 may be any of the previously discussed sensing devices 100, 200, 300. In this illustration, a near end user is holding the device 400 in their hand. Sensing device 412 may be positioned within an outer casing of handheld device 400 near a front face of handheld device 400 so that it can sense a proximity of a user when the user draws the phone toward their face. It is contemplated, however, that sensing device 412 may be associated with other portions of handheld device 400, for example, a bottom, a top or a side portion of handheld device 400. In one embodiment, opening 402 may be associated with an earpiece receiver 404. In some embodiments, opening 402 may be configured to accommodate both an earpiece receiver 404 and another component, such as an audio proximity sensing device.

Handheld device 400 may include various capabilities to enable the user to access features involving, for example, calls, text messages, voicemail, e-mail, the Internet, scheduling, photos, and music as shown on the touch screen display 406. In addition, handheld device 400 may include a microphone 408 and speakerphone speaker 410 to allow for input and/or output of audio signals to and from handheld device 400. When the user holds the handheld device 400 to their head during a call in, for example, the device handset mode, the earpiece receiver speaker 404 (which may be located at a top end portion of the handheld device 400) may be positioned against the user's ear. In that case, the sensing device 412 is situated in the general direction of the user. An emitter within sensing device 412 emits, for example, an IR light beam through the front face (which is formed by a transparent window or casing). The light beam is then reflected off of the user, and a based on the intensity of the beam, handheld device 400 can determine a proximity of the user, and for example, disable the touch screen display 406 when the device 400 is determined to be close to the user's face. In addition, when sensing device 412 detects a relatively low ambient light intensity level, the display lighting may be reduced, for example, to conserve battery power.

It is to be understood that although a handheld device such as an iPhone® from Apple Computer, Inc. of Cupertino, Calif., is illustrated in FIG. 4, any of the sensing devices disclosed herein may be implemented within any number of electronic devices that could benefit from a light and proximity sensing device. For example, sensing device 412 may be implemented within a tablet computer, a notebook computer or other portable computing device. In still further embodiments, sensing device 412 may be implemented within a digital media player, such as a portable music and/or video media player, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 5:
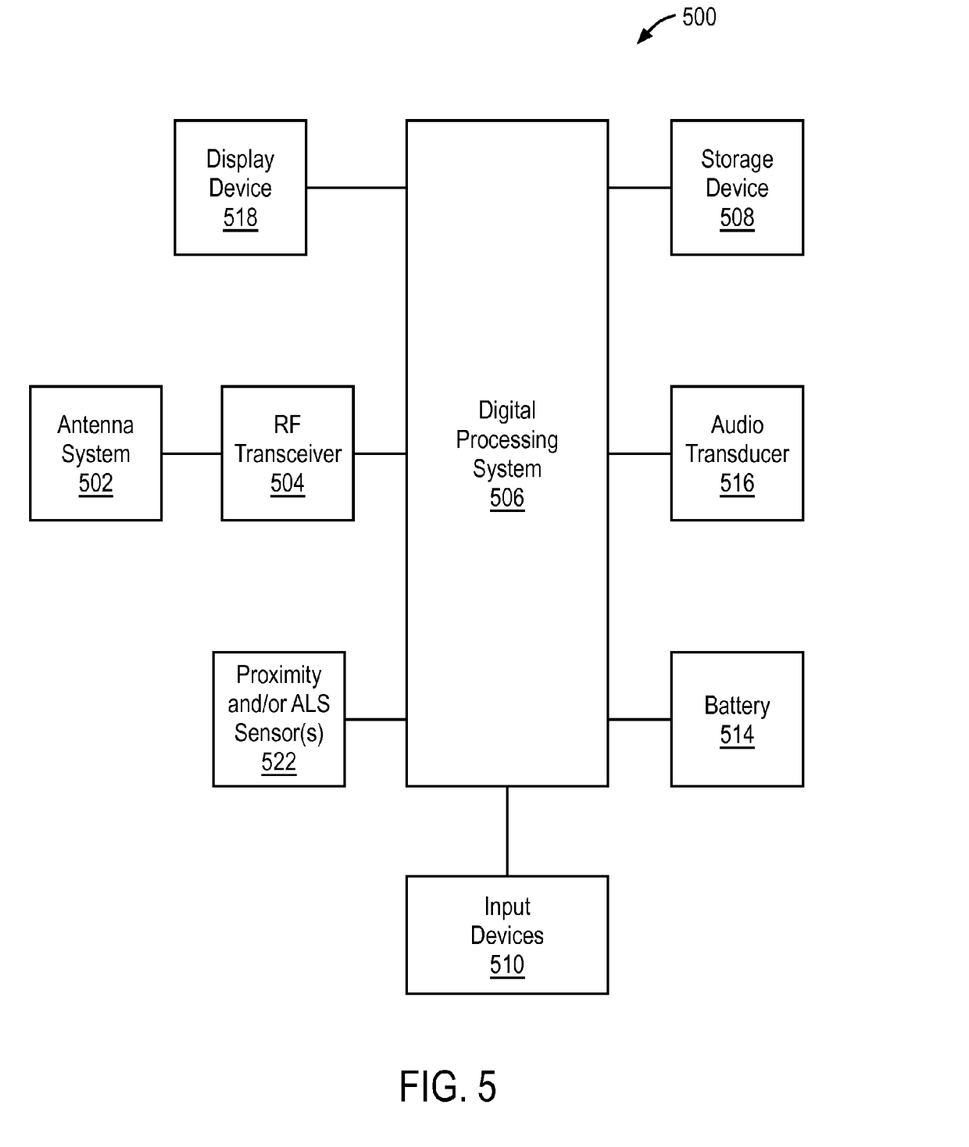
FIG. 5 is a block diagram of a system in which embodiments of a sensing device may be implemented.

FIG. 5 shows a block diagram of an embodiment of a wireless device 500 within which sensing device 412 (e.g., sensing devices 100, 200, 300) may be implemented. In the illustrated embodiment, wireless device 500 is a wireless communication device. The wireless device 500 may be included in the device shown in FIG. 4, although alternative embodiments of handheld device 400 may include more or fewer components than the wireless device 500.

Wireless device 500 may include an antenna system 502. Wireless device 500 may also include a radio frequency (RF) transceiver 504, coupled to the antenna system 502, to transmit and/or receive voice, digital data and/or media signals through antenna system 502.

A digital processing system 506 may further be provided to control the digital RF transceiver and to manage the voice, digital data and/or media signals. Digital processing system 506 may be a general purpose processing device, such as a microprocessor or controller for example. Digital processing system 506 may also be a special purpose processing device, such as an ASIC (application specific integrated circuit), FPGA (field-programmable gate array) or DSP (digital signal processor). Digital processing system 506 may also include other devices to interface with other components of wireless device 500. For example, digital processing system 506 may include analog-to-digital and digital-to-analog converters to interface with other components of wireless device 500.

A storage device 508, coupled to the digital processing system, may further be included in wireless device 500. Storage device 508 may store data and/or operating programs for the wireless device 500. Storage device 508 may be, for example, any type of solid-state or magnetic memory device.

One or more input devices 510, coupled to the digital processing system 506, to accept user inputs (e.g., telephone numbers, names, addresses, media selections, etc.) or output information to a far end user may further be provided. Exemplary input devices may be, for example, one or more of a keypad, a touchpad, a touch screen, a pointing device in combination with a display device or similar input device.

Display device 518 may be coupled to the digital processing system 506, to display information such as messages, telephone call information, contact information, pictures, movies and/or titles or other indicators of media being selected via the input device 510. Display device 518 may be, for example, an LCD display device. In one embodiment, display device 518 and input device 510 may be integrated together in the same device (e.g., a touch screen LCD such as a multi-touch input panel which is integrated with a display device, such as an LCD display device). It will be appreciated that the wireless device 500 may include multiple displays.

Battery 514 may further be provided to supply operating power to components of the system including digital RF transceiver 504, digital processing system 506, storage device 508, input device 510, audio transducer 516, proximity and/or ALS sensor(s) 522 (e.g., sensing devices 100, 200, 300), and display device 518. Battery 514 may be, for example, a rechargeable or non-rechargeable lithium or nickel metal hydride battery. Wireless device 500 may also include audio transducers 516, which may include one or more speakers, receivers and at least one microphone.

Proximity and/or ALS sensor(s) 522 may be coupled to the digital processing system 506. The proximity and/or ALS sensor(s) 522 may include, for example, one or more of a light and/or proximity sensor. Based on the data acquired by the proximity and/or ALS sensor(s) 522, various responses may be performed automatically by the digital processing system, such as, for example, activating or deactivating the backlight, changing a setting of the input device 510 (e.g., switching between processing or not processing, as an intentional user input, any input data from an input device), and other responses and combinations thereof. It is noted that other types of sensors may also be included in wireless device 500, such as an accelerometer, touch input panel, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof.

Returning to proximity and/or ALS sensor(s) 522, proximity and/or ALS sensor(s) 522 may include one or more ALS or proximity sensors (e.g., sensing devices 100, 200, 300) which provide data relating to light. The data can be analyzed by digital processing system 506 to determine whether or not to adjust one or more settings of wireless device 500. Ambient light level data may be provided by an ambient light sensor feature of the sensing device, which indicates the level of light intensity surrounding that sensor. For example, ambient light differential data may be obtained from two or more ambient light sensors which are disposed at different positions on the device. For example, one ambient light sensor may be on one side of the device, and another ambient light sensor may be on another side of the device. A difference in the light intensity levels may be determined by comparing the data from these two ambient light sensors on two different sides or surfaces of the device.

There are a variety of possible uses of a light sensor. For example, the light sensor may be used with a proximity sensor to determine when a device is placed in a pocket to cause the device to be set in vibrate mode only or vibrate mode with audible ringing. In another example, in response to a light sensor determining that the ambient light is very low, and optionally in response to a user having set the device to visibly light up to show an incoming call when the ambient light is very low, the device may automatically be put in a "light ring" mode when it is dark so that instead of an audible ring from the device, the display flashes visibly (e.g., by repeatedly turning on and off the backlight) to indicate an incoming call. Another exemplary use of a light sensor involves using it as an alarm indicating that a dark room (or environment) has become brighter (e.g., the sun has risen or a door to a darkened room is opened to let light into the room). A light sensor may also be used to cause a device to automatically act as a source of light (e.g., as a flashlight, in effect) upon sensing a low ambient light level.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although portable handle held devices are described herein, it is contemplated that sensing device may be implemented in other types of devices including, but not limited to, a desk top computer, television or the like. The description is thus to be regarded as illustrative instead of limiting.

What is claimed is:

1. A proximity and light sensing apparatus comprising:
a radiation emitter for proximity sensing positioned on a substrate;
a radiation detector positioned on the substrate, the radiation detector configured to detect radiation from the emitter; and
an ambient light detector positioned on the substrate and around the radiation emitter so as to form a border substantially entirely around the radiation emitter and detect off-axis ambient light rays.

2. The proximity and light sensing apparatus of claim 1 wherein the ambient light detector is configured to detect off-axis ambient light rays that are at least 20 degrees off-axis.

3. The proximity and light sensing apparatus of claim 1 wherein the ambient light detector is configured to detect East off-axis ambient light rays.

4. The proximity and light sensing apparatus of claim 1 wherein the ambient light detector is configured to detect West off-axis ambient light rays.

5. The proximity and light sensing apparatus of claim 1 wherein the ambient light detector is a first ambient light detector, wherein the apparatus further comprises:
a second ambient light detector positioned on the substrate and around the radiation detector.

6. The proximity and light sensing apparatus of claim 5 wherein the second ambient light detector forms a border around only a portion of the radiation detector.

7. The proximity and light sensing apparatus of claim 1 wherein the ambient light detector is configured to detect ambient light outside of a viewing angle of the radiation emitter.

8. The proximity and light sensing apparatus of claim 1 wherein the radiation detector is configured to detect infrared (IR) radiation emitted from the radiation emitter and visible light from the ambient environment.

9. A proximity and light sensing apparatus comprising:
a first compartment having a radiation emitter for proximity sensing positioned on a substrate and an optical element positioned along a side of the radiation emitter opposite the substrate;
a second compartment having a radiation detector positioned on the substrate and an optical element positioned along a side of the radiation detector opposite the substrate;
a mid wall extending in a direction substantially normal to the substrate, the mid wall positioned between the first compartment and the second compartment; and
an ambient light detector positioned within the first compartment and substantially surrounding the radiation emitter, wherein the ambient light detector is dimensioned to detect East off-axis ambient light rays directed toward a portion of the substrate between the radiation emitter and the mid wall.

10. The proximity and light sensing apparatus of claim 9 wherein the first compartment comprises only one optical element and the ambient light detector detects East off-axis ambient light rays transmitted through the only one optical element.

11. The proximity and light sensing apparatus of claim 9 wherein the ambient light detector is between the radiation emitter and the mid wall and the off-axis ambient light rays are at least 20 degrees off-axis.

12. The proximity and light sensing apparatus of claim 9 wherein the ambient light detector is further dimensioned to detect off-axis West rays.

13. The proximity and light sensing apparatus of claim 9 wherein the radiation detector is configured to detect infrared (IR) radiation emitted from the radiation emitter and visible light from the ambient environment.

14. The proximity and light sensing apparatus of claim 9 wherein the radiation emitter is configured to emit IR radiation and detect visible light from the ambient environment.

15. A proximity and light sensing apparatus comprising:
a first compartment having a radiation emitter and an ambient light detector, wherein the radiation emitter is positioned on a substrate and the ambient light detector is positioned substantially entirely around the radiation emitter and the ambient light detector is configured to detect ambient light outside of a viewing angle of the radiation emitter; and
a second compartment having a radiation detector positioned on the substrate, wherein the radiation detector is configured to detect radiation emitted from the radiation emitter.

16. The proximity and light sensing apparatus of claim 15 wherein the ambient light detector is a first ambient light detector, wherein the apparatus further comprises:
a second ambient light detector positioned on the substrate and around the radiation detector, wherein the second ambient light detector is configured to detect ambient light rays outside of a viewing angle of the radiation detector.

17. The proximity and light sensing apparatus of claim 15 wherein the ambient light detector is configured to detect ambient light rays which are at least 20 degrees off-axis with respect to an optical axis of the radiation emitter.

18. The proximity and light sensing apparatus of claim 15 wherein the ambient light detector is a first ambient light detector, wherein the apparatus further comprises:
a second ambient light detector positioned on the substrate and around the radiation detector, wherein the second ambient light detector is configured to detect off-axis ambient light rays which are at least 20 degrees off-axis with respect to an optical axis of the radiation detector in an East direction.

19. The proximity and light sensing apparatus of claim 15 wherein the radiation detector is configured to detect infrared (IR) radiation emitted from the radiation emitter and visible light from the ambient environment.

* * * * *